US011864068B2

(12) United States Patent
Huang et al.

(10) Patent No.: US 11,864,068 B2
(45) Date of Patent: Jan. 2, 2024

(54) VERIFICATION CODE OBTAINING METHOD AND APPARATUS, AND TERMINAL

(71) Applicant: Huawei Technologies Co., Ltd., Shenzhen (CN)

(72) Inventors: Xi Huang, Shenzhen (CN); Zuoqiang Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/696,112

(22) Filed: Mar. 16, 2022

(65) Prior Publication Data

US 2022/0210617 A1 Jun. 30, 2022

Related U.S. Application Data

(63) Continuation of application No. 17/038,806, filed on Sep. 30, 2020, now Pat. No. 11,317,257, which is a (Continued)

(51) Int. Cl.
*H04W 4/14* (2009.01)
*H04W 12/06* (2021.01)
(Continued)

(52) U.S. Cl.
CPC ............ *H04W 4/14* (2013.01); *G06F 21/575* (2013.01); *G06F 21/629* (2013.01);
(Continued)

(58) Field of Classification Search
None
See application file for complete search history.

(56) References Cited

U.S. PATENT DOCUMENTS

2011/0265149 A1 10/2011 Ganesan
2013/0067254 A1 3/2013 Liang et al.
(Continued)

FOREIGN PATENT DOCUMENTS

CN 103036681 A 4/2013
CN 104009977 A 8/2014
(Continued)

OTHER PUBLICATIONS

Mulliner, SMS-Based One-Time Passwords: Attacks and Defense (Short Paper), XP47036547A, DIMVA 2013, NCS 7967, 2013, pp. 150-159.

*Primary Examiner* — Mazda Sabouri
(74) *Attorney, Agent, or Firm* — Conley Rose, P.C.

(57) ABSTRACT

A method includes sending, by an application that is to obtain a verification code, a verification code obtaining request to a server, where the application that is to obtain a verification code is installed on a terminal, and where applications installed on the terminal further include an input method application and a short message service (SMS) message application; receiving, by the SMS message application, an SMS message that includes a verification code and that is sent by the server; and reading, by the input method application, the verification code in the SMS message, where the terminal does not allow an application other than the input method application and the SMS message application to read an SMS message in the terminal.

20 Claims, 9 Drawing Sheets

Related U.S. Application Data continuation of application No. 16/067,167, filed as application No. PCT/CN2015/100245 on Dec. 31, 2015, now Pat. No. 10,841,754.

(51) Int. Cl.
| | |
|---|---|
| *H04W 88/02* | (2009.01) |
| *G06F 21/62* | (2013.01) |
| *G06F 21/57* | (2013.01) |
| *H04L 9/08* | (2006.01) |
| *H04L 9/40* | (2022.01) |
| *G06F 21/42* | (2013.01) |

(52) U.S. Cl.
CPC ........ *G06F 21/6218* (2013.01); *H04L 9/0866* (2013.01); *H04L 9/0894* (2013.01); *H04W 12/06* (2013.01); *H04W 88/02* (2013.01); *G06F 21/42* (2013.01); *G06F 21/6281* (2013.01); *H04L 63/18* (2013.01)

(56) References Cited

U.S. PATENT DOCUMENTS

| | | |
|---|---|---|
| 2014/0333632 A1 | 11/2014 | Kim et al. |
| 2014/0380508 A1 | 12/2014 | Cao |
| 2015/0074391 A1 | 3/2015 | Souza et al. |
| 2015/0271163 A1 | 9/2015 | Greenspan et al. |
| 2016/0078430 A1 | 3/2016 | Douglas et al. |
| 2016/0197914 A1 | 7/2016 | Oberheide et al. |
| 2017/0024226 A1 | 1/2017 | Yan |
| 2017/0331819 A1 | 11/2017 | Quirke et al. |
| 2018/0054731 A1 | 2/2018 | Huang et al. |
| 2019/0068584 A1* | 2/2019 | Sun ................. H04W 4/20 |
| 2020/0169415 A1* | 5/2020 | Schmidt ............ H04W 12/068 |

FOREIGN PATENT DOCUMENTS

| | | |
|---|---|---|
| CN | 104683963 A | 6/2015 |
| CN | 104703151 A | 6/2015 |
| CN | 104796385 A | 7/2015 |
| CN | 104935744 A | 9/2015 |
| CN | 104980580 | 10/2015 |
| CN | 104980580 A | 10/2015 |
| CN | 105049607 A | 11/2015 |
| CN | 105142139 A | 12/2015 |
| CN | 105159533 A | 12/2015 |
| CN | 105162784 A | 12/2015 |
| EP | 2854003 A2 | 4/2015 |
| EP | 3389292 B1 | 6/2021 |
| KR | 20110051099 A | 5/2011 |
| KR | 20140001442 U | 3/2014 |
| WO | 2015088853 A1 | 6/2015 |
| WO | 2017097144 A1 | 6/2017 |

* cited by examiner

A verification code has been sent to your mobile phone:
188******85

Fill in a verification code

Resend a verification code in 57 seconds

The mobile phone is not by your side?

A verification code has been sent to your mobile phone:
188******85

Fill in a verification code

Resend a verification code in 57 seconds

The mobile phone is not by your side?

A verification code has been sent to your mobile phone:
188******85

Fill in a verification code

Resend a verification code in 57 seconds

The mobile phone is not by your side?

A verification code has been sent to your mobile phone:
188******85

Fill in a verification code

Resend a verification code in 57 seconds

The mobile phone is not by your side?

A verification code has been sent to your mobile phone:
188******85

Resend a verification code in 57 seconds

The mobile phone is not by your side?

A verification code has been sent to your mobile phone:
188******85

2 4

Resend a verification code in 57 seconds

The mobile phone is not by your side?

A verification code has been sent to your mobile phone:
188******85

2 4 6

Resend a verification code in 57 seconds

The mobile phone is not by your side?

VERIFICATION CODE OBTAINING METHOD AND APPARATUS, AND TERMINAL

CROSS-REFERENCE TO RELATED APPLICATIONS

This is a continuation of U.S. patent application Ser. No. 17/038,806 filed on Sep. 30, 2020, which is a continuation of U.S. patent application Ser. No. 16/067,167 filed on Jun. 29, 2018, now U.S. Pat. No. 10,841,754, which is a U.S. National Stage of International Patent Application No. PCT/CN2015/100245 filed on Dec. 31, 2015. All of the aforementioned patent applications are hereby incorporated by reference in their entireties.

TECHNICAL FIELD

Embodiments of the present invention relate to the field of security technologies, and in particular, to a verification code obtaining method and apparatus, and a terminal.

BACKGROUND

With occurrence of various network security events such as leakage or theft of a network account and a password, a common manner of logging in to an account by using a verification code is not necessarily a secure and risk-free operation. To better protect user privacy, more application (Application, APP for short) developers use a dual authentication protection mechanism for a login or a sensitive operation of an application. Using a verification code (or referred to as a check code) is one of most common manners. A verification code (Verification Code) received in a form of a short message service (Short Message Service, SMS for short) message is also usually referred to as an SMS message verification code.

Currently, in an Android (Android) system, an application may read all SMS messages in the system by applying for SMS message (text message or short message, or referred to as an SMS message or an SMS message) read permission, and obtain a verification code from the SMS message. A main function of most applications other than an SMS message application that apply for SMS message permission is to read an SMS message verification code. The system provides the application with permission to read all SMS message records. After the system receives an SMS message, the system sends a broadcast that the SMS message is received. After receiving the broadcast, the application having the SMS message read permission reads content of the SMS message, and extracts a verification code in the SMS message.

A problem is that the SMS message read permission obtained by the application is permission to read all the SMS messages. The application can read not only normal verification code information but also information that is received and sent by a user when the user normally uses the SMS message application. This easily causes user privacy leakage. In addition, the SMS message verification code belongs to sensitive content. Any application having SMS message read permission in the prior art can read an SMS message verification code of another application. This also causes a service such as mobile payment on a mobile terminal to face a risk.

SUMMARY

Embodiments of the present invention provide a verification code obtaining method and apparatus, and a terminal, so as to prevent leakage of information about an SMS message of a user and ensure security of verification code information in the SMS message.

According to a first aspect, a verification code obtaining method is provided, and the method includes the following steps: sending, by an application that is to obtain a verification code, a verification code obtaining request to a server, where the application that is to obtain a verification code is installed on a terminal, and applications installed on the terminal further include an input method application and an SMS message application; receiving, by the SMS message application, an SMS message that includes a verification code and that is sent by the server; and reading, by the input method application, the verification code in the SMS message, where the terminal does not allow an application other than the input method application and the SMS message application to read an SMS message in the terminal. Therefore, only the input method application and the SMS message application can read the verification code in the SMS message, and another application cannot read the verification code, so that leakage of information about an SMS message of a user can be prevented. In a mobile payment or verification field, a risk faced by mobile payment or verification can also be reduced, to ensure security of the mobile payment or verification.

With reference to the first aspect, in a first possible implementation of the first aspect, after the reading, by the input method application, the verification code in the SMS message, the method further includes: filling a verification code input area with the read verification code. A trouble that the user needs to first remember the verification code and then manually enter the verification code can be avoided, thereby improving user experience.

With reference to the first aspect, in a second possible implementation of the first aspect, after the reading, by the input method application, the verification code in the SMS message, the method further includes: displaying the read verification code in a display area of the input method application on the terminal. A trouble that the user opens the SMS message application to view the verification code can be avoided. Then, the user fills in a verification code input box with the verification code based on the verification code displayed in the area of the input method application. In comparison with a solution of automatically filling in a verification code, this solution in which the verification code is first displayed in the area of the input method application and then the user manually enters the verification code can ensure accuracy of entering the verification code.

In a possible implementation, the verification code input area is filled in with the verification code based on a tap operation performed by the user on the verification code displayed in the display area of the input method application on the terminal.

With reference to the first aspect, in a third possible implementation of the first aspect, after the reading, by the input method application, the verification code in the SMS message, the method further includes: displaying characters in a character string one by one on a keyboard of the input method application in a sequence of the characters in the character string included in the read verification code. The user is reminded of a to-be-entered verification code in a more intuitive manner in this solution.

In a possible implementation, the characters in the character string are displayed one by one in an animation manner on the input method application. The animation manner includes changing a size, a shape, a color, a border, a shade, or the like of a corresponding character in an area of the input method application.

With reference to any one of the first aspect to the third possible implementation of the first aspect, in a fourth possible implementation of the first aspect, the receiving, by the SMS message application, an SMS message that includes a verification code and that is sent by the server is specifically: receiving, by the SMS message application within a preset time, at least two SMS messages that include a verification code and that are sent by the server; after the receiving, by the SMS message application, an SMS message that includes a verification code and that is sent by the server, the method further includes: determining all SMS messages that include a verification code and that are received within the preset time, and determining an SMS message that includes an application identifier in all the SMS messages that include a verification code, where the application identifier is used to identify the application that is to obtain a verification code; and the reading, by the input method application, the verification code in the SMS message is specifically: reading, by the input method application, a verification code in the SMS message that includes the application identifier. When the user receives a plurality of verification codes within a specific time, a verification code meeting a condition can be automatically screened, so that a trouble that the user performs manual screening is avoided.

With reference to the fourth possible implementation of the first aspect, in a fifth possible implementation of the first aspect, the determining an SMS message that includes an application identifier in all the SMS messages that include a verification code is specifically: if it is determined that there are at least two SMS messages that include the application identifier in all the SMS messages that include a verification code, determining an SMS message that is received at a latest time in the SMS messages that include the application identifier; and the reading, by the input method application, a verification code in the SMS message that includes the application identifier is specifically: reading, by the input method application, a verification code in the SMS message received at the latest time. The trouble that the user manually selects the verification code meeting the condition can be avoided.

According to a second aspect, a verification code obtaining apparatus is provided, applications installed on the apparatus include an application that is to obtain a verification code, an input method application, and an SMS message application, and the apparatus further includes: a sending unit, configured to send a verification code obtaining request to a server; a receiving unit, configured to receive an SMS message that includes a verification code and that is sent by the server; and a reading unit, configured to read the verification code in the SMS message, where the apparatus does not allow an application other than the input method application and the SMS message application to read an SMS message in the apparatus. Therefore, only the input method application and the SMS message application can read the verification code in the SMS message, and another application cannot read the verification code, so that leakage of information about an SMS message of a user can be prevented. In a mobile payment or verification field, a risk faced by mobile payment or verification can also be reduced, to ensure security of the mobile payment or verification.

With reference to the second aspect, in a first possible implementation of the second aspect, the apparatus further includes a filling unit, configured to fill a verification code input area with the read verification code. A trouble that the user needs to first remember the verification code and then manually enter the verification code can be avoided, thereby improving user experience.

With reference to the second aspect, in a second possible implementation of the second aspect, the apparatus further includes a first display unit, configured to display the read verification code in a display area of the input method application on the apparatus. A trouble that the user opens the SMS message application to view the verification code can be avoided. Then, the user fills in a verification code input box with the verification code based on the verification code displayed in the area of the input method application. In comparison with a solution of automatically filling in a verification code, this solution in which the verification code is first displayed in the area of the input method application and then the user manually enters the verification code can ensure accuracy of entering the verification code.

With reference to the second aspect, in a third possible implementation of the second aspect, the apparatus further includes a second display unit, configured to display characters in a character string one by one on a keyboard of the input method application in a sequence of the characters in the character string included in the read verification code. The user is reminded of a to-be-entered verification code in a more intuitive manner in this solution.

In a possible implementation, the characters in the character string are displayed one by one in an animation manner on the input method application. The animation manner includes changing a size, a shape, a color, a border, a shade, or the like of a corresponding character in an area of the input method application.

With reference to any one of the second aspect to the third possible implementation of the second aspect, in a fourth possible implementation of the second aspect, the receiving unit is specifically configured to receive, within a preset time, at least two SMS messages that include a verification code and that are sent by the server; the apparatus further includes: a first determining unit, configured to determine all SMS messages that include a verification code and that are received within the preset time; and a second determining unit, configured to determine an SMS message that includes an application identifier in all the SMS messages that include a verification code, where the application identifier is used to identify the application that is to obtain a verification code; and the reading unit is specifically configured to read a verification code in the SMS message that includes the application identifier. When the user receives a plurality of verification codes within a specific time, a verification code meeting a condition can be automatically screened, so that a trouble that the user performs manual screening is avoided.

With reference to the fourth possible implementation of the second aspect, in a fifth possible implementation of the second aspect, the second determining unit is specifically configured to: if it is determined that there are at least two SMS messages that include the application identifier in all the SMS messages that include a verification code, determine an SMS message that is received at a latest time in the SMS messages that include the application identifier; and the reading unit is specifically configured to read a verification code in the SMS message received at the latest time. The trouble that the user manually selects the verification code meeting the condition can be avoided.

According to a third aspect, a terminal is provided, including a processor, a memory, and a transceiver, where the memory is configured to store applications, where the applications are installed on the terminal, the applications stored in the memory include an application that is to obtain a verification code, an input method application, and an SMS message application, and the SMS message application is used to display an SMS message in the terminal; the transceiver is configured to send a verification code obtaining request to a server; the transceiver is further configured to receive an SMS message that includes a verification code and that is sent by the server; and the processor is configured to read the verification code in the SMS message, where the terminal does not allow an application other than the input method application and the SMS message application to read the SMS message in the terminal. Therefore, only the input method application and the SMS message application can read the verification code in the SMS message, and another application cannot read the verification code, so that leakage of information about an SMS message of a user can be prevented. In a mobile payment or verification field, a risk faced by mobile payment or verification can also be reduced, to ensure security of the mobile payment or verification.

With reference to the third aspect, in a first possible implementation of the third aspect, the processor is further configured to fill a verification code input area with the read verification code. A trouble that the user needs to first remember the verification code and then manually enter the verification code can be avoided, thereby improving user experience.

With reference to the third aspect, in a second possible implementation of the third aspect, the processor is further configured to display the read verification code in a display area of the input method application on the terminal. A trouble that the user opens the SMS message application to view the verification code can be avoided. Then, the user fills in a verification code input box with the verification code based on the verification code displayed in the area of the input method application. In comparison with a solution of automatically filling in a verification code, this solution in which the verification code is first displayed in the area of the input method application and then the user manually enters the verification code can ensure accuracy of entering the verification code.

With reference to the third aspect, in a third possible implementation of the third aspect, the processor is further configured to display characters in a character string one by one on a keyboard of the input method application in a sequence of the characters in the character string included in the read verification code. The user is reminded of a to-be-entered verification code in a more intuitive manner in this solution.

In a possible implementation, the characters in the character string are displayed one by one in an animation manner on the input method application. The animation manner includes changing a size, a shape, a color, a border, a shade, or the like of a corresponding character in an area of the input method application.

With reference to any one of the third aspect to the third possible implementation of the third aspect, in a fourth possible implementation of the third aspect, the transceiver is specifically configured to receive, within a preset time, at least two SMS messages that include a verification code and that are sent by the server; and the processor is further configured to: determine all SMS messages that include a verification code and that are received within the preset time; determine an SMS message that includes an application identifier in all the SMS messages that include a verification code, where the application identifier is used to identify the application that is to obtain a verification code; and read a verification code in the SMS message that includes the application identifier. When the user receives a plurality of verification codes within a specific time, a verification code meeting a condition can be automatically screened, so that a trouble that the user performs manual screening is avoided.

With reference to the fourth possible implementation of the third aspect, in a fifth possible implementation of the third aspect, the processor is further specifically configured to: if it is determined that there are at least two SMS messages that include the application identifier in all the SMS messages that include a verification code, determine an SMS message that is received at a latest time in the SMS messages that include the application identifier; and read a verification code in the SMS message received at the latest time. The trouble that the user manually selects the verification code meeting the condition can be avoided.

According to a fourth aspect, a computer readable storage medium storing one or more programs is provided, where the one or more programs include an instruction, a portable electronic device including a display and a plurality of applications performs the method according to any one of the first aspect to the fifth possible implementation of the first aspect when the instruction is executed by the portable electronic device, and the display is configured to display an application running on the portable electronic device.

According to a fifth aspect, a verification code obtaining method is provided, and the method includes: sending, by an application that is to obtain a verification code, a verification code obtaining request to a server, where the application that is to obtain a verification code runs on an operating system; based on a received SMS message that includes a verification code and that is sent by the server, reading, by the operating system, the verification code in the SMS message, and sending the read verification code to a clipboard of the operating system; and receiving, by the operating system, a pasting instruction, and pasting the verification code on the clipboard in a verification code input area. In this solution, the operating system directly reads the verification code onto the clipboard without a need to consider whether to provide another application program with SMS message read permission, so that it can be convenient for a user to enter the verification code, and it can be ensured that user SMS message privacy is not leaked.

According to a sixth aspect, a terminal is provided, including a processor, a memory, and a transceiver, where the memory is configured to store an application that is to obtain a verification code; the transceiver is configured to send a verification code obtaining request to a server; the transceiver is further configured to receive an SMS message that includes a verification code and that is sent by the server; the processor is configured to: read the verification code in the SMS message, and send the read verification code to a clipboard of the operating system; and the processor is further configured to paste the verification code on the clipboard in a verification code input area based on a pasting instruction. In this solution, the processor directly reads the verification code onto the clipboard without a need to consider whether to provide another application program with SMS message read permission, so that it can be convenient for a user to enter the verification code, and it can be ensured that user SMS message privacy is not leaked.

In a possible implementation, before the application that is to obtain a verification code sends the verification code obtaining request to the server, the method further includes: receiving a verification code obtaining operation triggered by a user. The verification code obtaining operation is triggered by the user, so that the application can be prevented from randomly sending verification code information.

In a possible implementation, the operating system includes an Android operating system, an iOS operating system, and a Windows Phone operating system.

In a possible implementation, the input method application and the SMS message application are applications developed by a developer of the operating system running on the terminal. In this case, the input method application and the SMS message application are default applications of the operating system, and are more secure than a third-party application.

In a possible implementation, the input method application and the SMS message application are applications developed by a third-party application developer, and the third-party application developer is an application developer other than a developer of the operating system running on the terminal.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts shall fall within the protection scope of the present invention.

Ordinal numbers such as "first" and "second" mentioned in the embodiments of the present invention shall only serve the purpose of differentiation unless the numbers definitely indicate a sequence based on the context.

Currently, an operating system commonly used on a terminal includes an Android operating system developed by Google, an iOS operating system developed by Apple, and a Windows Phone operating system developed by Microsoft.

Figure 1A:
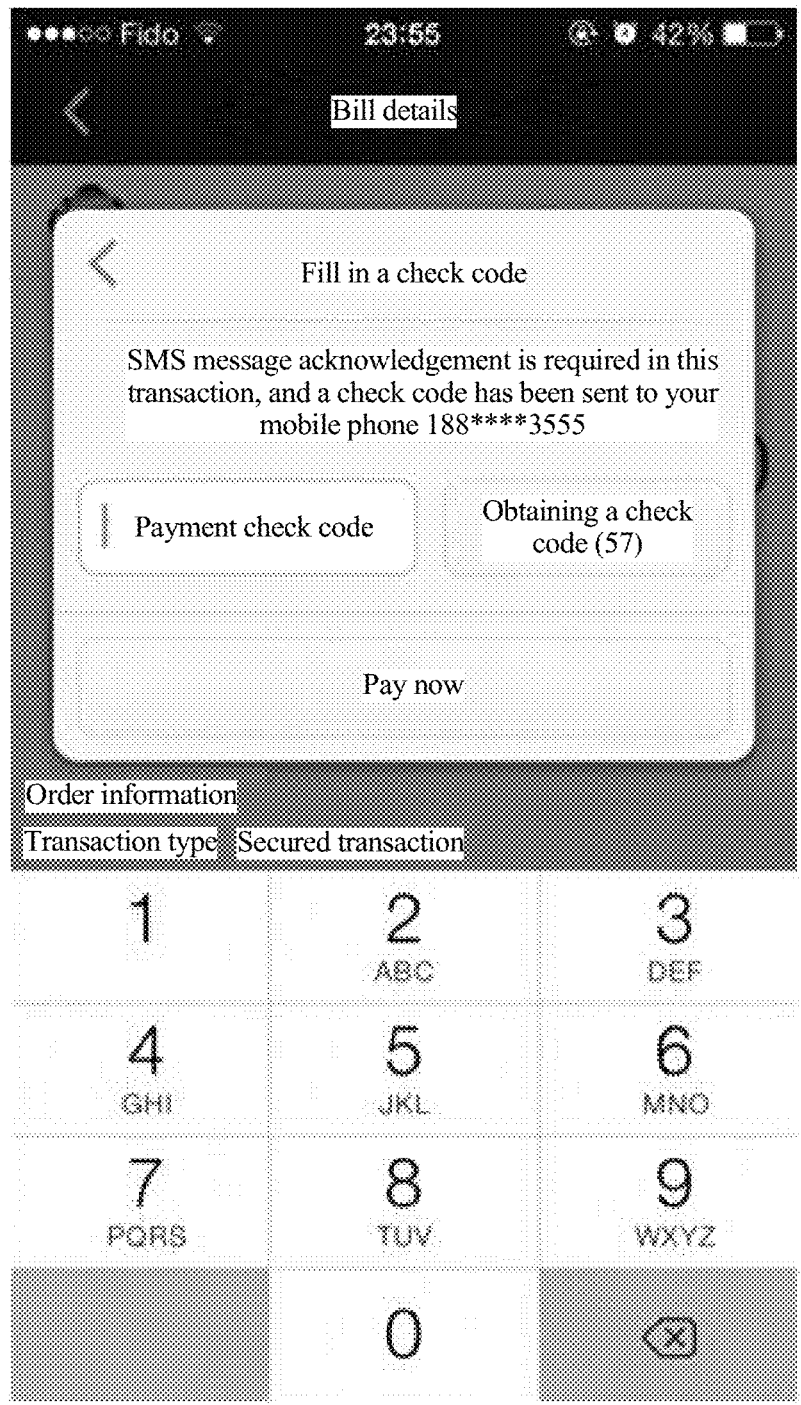
FIG. 1A is an example diagram of a verification code obtaining method.
Figure 1B:
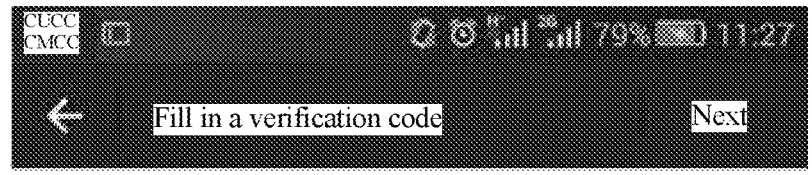
FIG. 1B is an example diagram of another verification code obtaining method.
Figure 1B:
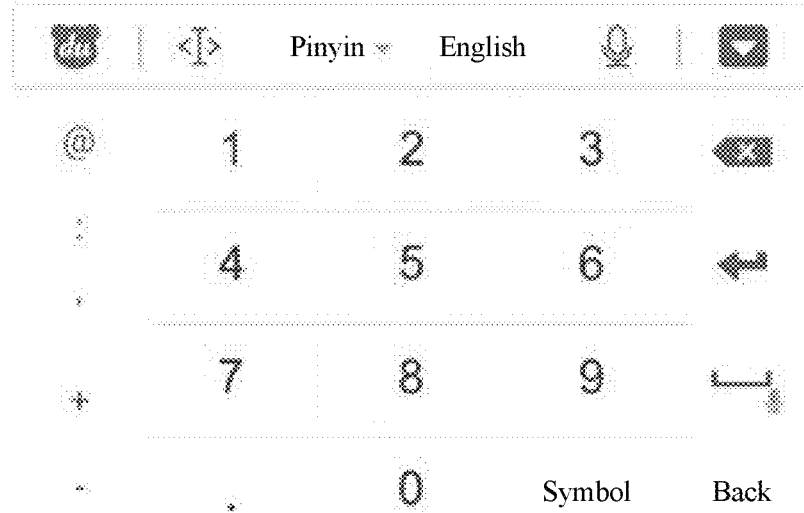
Figure 1C:
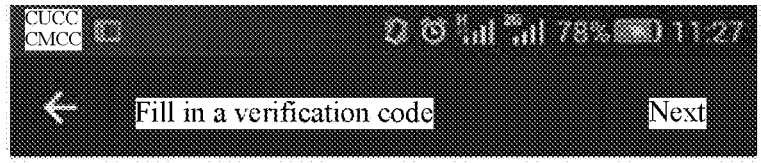
FIG. 1C is an example diagram of still another verification code obtaining method.
Figure 1C:
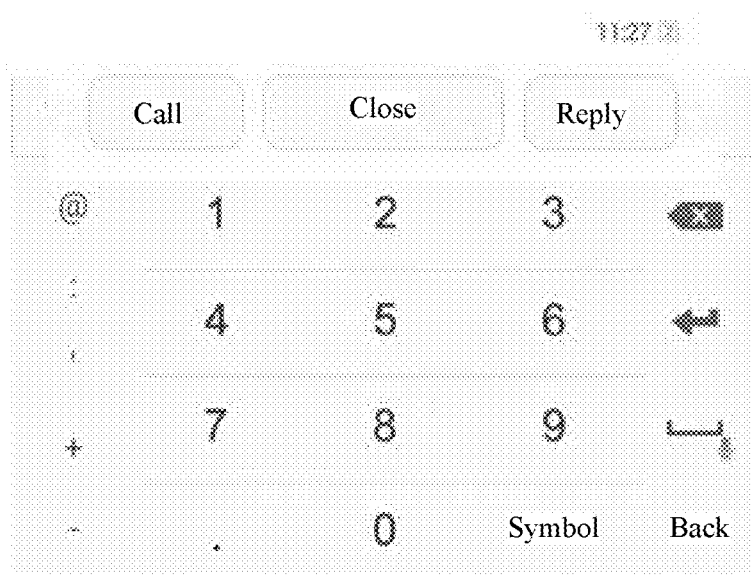

In an example in which the Android (Android) system is used, an application may read all SMS messages in the system by applying for SMS message read permission, and obtain a verification code from the SMS message. A main function of most applications other than an SMS message application that apply for SMS message permission is to read an SMS message verification code. As shown in FIG. 1A, a user uses an application for shopping. For transaction security, the application prompts that the user needs to fill in a check code. After a terminal receives an SMS message including a check code, the user may manually fill in a "payment check code" input box in FIG. 1A with the check code in the SMS message. If the application has applied for SMS message read permission, the application may extract the check code in the SMS message, and automatically fill in the "payment check code" input box in FIG. 1A with the extracted check code. For another example, as shown in FIG. 1B and FIG. 1C, when a user logs in to WeChat (WeChat), for account security of the user, the user is required to enter a verification code. After the user receives a verification code SMS message from "Tencent Technology", the user may manually enter a verification code "240960" in the SMS message into a "Fill in a verification code" input box in FIG. 1C. If WeChat has applied for SMS message read permission, WeChat may extract the verification code in the SMS message, and automatically fill in the "Fill in a verification code" input box in FIG. 1C with the verification code "240960" in the SMS message.

To automatically extract a verification code in an SMS message and automatically enter the extracted verification code into a verification code input box, an application (such as WeChat) first needs to apply for permission to read an SMS message in a system. After the system receives an SMS message, the system sends a broadcast that the SMS message is received. After receiving the broadcast, WeChat reads content of the SMS message, and extracts a verification code from the SMS message. However, the SMS message read permission of WeChat is permission to read all SMS messages in the system. WeChat can read not only a verification code SMS message required by WeChat, but also an SMS message that is received and sent by a user when the user normally uses an SMS message application. In addition, WeChat can read an SMS message verification code of another application. This causes a service such as mobile payment on a mobile terminal to face a risk, and also easily causes user privacy leakage.

Embodiment 1

Embodiment 1 provides a verification code obtaining method. The method includes the following steps:

101. An application that is to obtain a verification code sends a verification code obtaining request to a server, where the application that is to obtain a verification code is installed on a terminal, and applications installed on the terminal further include an input method application and an SMS message application.

The application that is to obtain a verification code is an application installed on the terminal. For example, the application may be WeChat, Alipay (Alipay), or the like. An operating system running on the terminal may be an Android operating system, an iOS operating system, and a Windows Phone operating system.

Applications installed on the terminal by default usually include the input method application and the SMS message application. In another embodiment, the input method application and the SMS message application are applications developed by a developer of the operating system running on the terminal. In still another embodiment, the input method application and the SMS message application are applications developed by a third-party application developer, and the third-party application developer is an application developer other than a developer of the operating system running on the terminal. For example, a developer of Android is Google. In this case, a default input method in a native Android system is a Google input method. The Google input method is an application developed by the developer of the Android system. A Sogou input method or a Swype input method is an application developed by a third-party application developer.

Similarly, a default Android 5.0 SMS message application is Messenger, which is an SMS message application developed by Google. An SMS message application Textra or GoSMS is an application developed by a third-party application developer. In Android systems of some versions, Hangouts (Hangout) may be used to display an SMS message in the terminal, and therefore Hangouts also belongs to an SMS message application. Usually, all SMS message applications may be used to manage and display an SMS message in the terminal.

For another example, in relative to the Android system, Google map is an application developed by the Android system developer Google, and is referred to as a native Android application. In relative to an iOS system of Apple, Google map belongs to an application developed by a third-party developer, and Google map is not a native iOS application.

The server is a server corresponding to the application that is to obtain a verification code. For example, a server corresponding to WeChat may be a server of Tencent, or may be a leased server. This is not limited in the present invention.

102. The SMS message application receives an SMS message that includes a verification code and that is sent by the server.

The SMS message application may receive and send an SMS message, and may specifically receive and send the SMS message by using a transceiver.

A possible form of the SMS message is as follows:

SMS message example 1: (2665) Didi Chuxing verification code [Didi Chuxing]

"2665" is a verification code required by a Didi Chuxing APP.

SMS message example 2: Verification code: 236820. Please do not forward. A 12306 user is applying for a password modification service. If you did not perform this operation, please ignore this message. [Railway Customer Service]

"236820" is a verification code required by a Railway 12306 APP.

SMS message example 3: [G.CN] Your Google verification code is 989345.

"989345" is a verification code required by a Google service.

103. The input method application reads the verification code in the SMS message, where the terminal does not allow an application other than the input method application and the SMS message application to read an SMS message in the terminal.

To ensure user information security, the terminal allows only the input method application and the SMS message application to read the SMS message. In most cases, a terminal has an input method application and an SMS message application. The input method application is used to enter information, for example, by using typewriting, handwriting, or voice input. The SMS message application is used to display an SMS message in the terminal. An input method application and an SMS message application are installed by default regardless of an Android system, an iOS system, or a Windows Phone system.

If a user installs a third-party input method application or a third-party SMS message application, and trusts the third-party input method application or the third-party SMS message application, the user may allow, to read the SMS message in the terminal, the input method application or the SMS message application developed by a third-party developer. For example, the user allows the Sogou input method to read the SMS message in the terminal. The permission to allow an application to read the SMS message may be that a system provides an application with SMS message read permission by default; or may be that a prompt pops up, so that the user chooses whether to provide an application with SMS message read permission. For example, the user installs the Sogou input method that is a third-party input method. If the Sogou input method requests SMS message read permission, a prompt pops up in the system, so that the user chooses whether to provide the Sogou input method with the SMS message read permission. Alternatively, the user installs the Sogou input method that is a third-party input method. Regardless of whether the Sogou input method applies for SMS message read permission, when the system detects that the user installs the input method application, a prompt pops up, so that the user chooses whether to provide the newly installed input method with the SMS message read permission. An implementation in which the SMS message application requests the SMS message read permission is similar to that of the input method application.

In an embodiment, after the input method application reads the verification code in the SMS message, the method further includes: filling a verification code input area with the read verification code.

"Payment check code" in FIG. 1A is a verification code input area of WeChat. The input area may be an input box. For convenience of the user, the terminal may directly extract the verification code in the SMS message through semantic analysis, and automatically fill in the verification code input area with the extracted verification code, so that a trouble that the user needs to first remember the verification code and then manually enter the verification code can be avoided, thereby improving user experience.

Figure 2A:
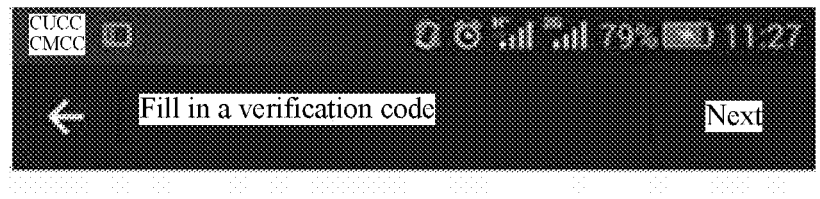
FIG. 2A is an example diagram of displaying a verification code according to an embodiment of the present invention.
Figure 2A:
Figure 2B:
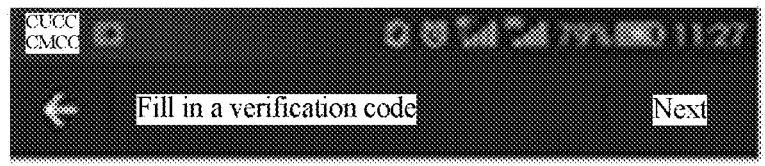
FIG. 2B is another example diagram of displaying a verification code according to an embodiment of the present invention.
Figure 2B:
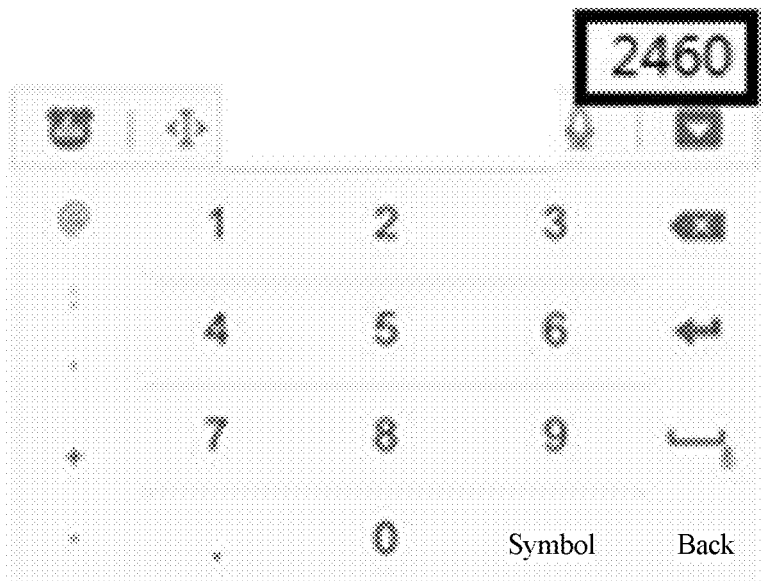

In another embodiment, after the input method application reads the verification code in the SMS message, the method further includes: displaying the read verification code in a display area of the input method application on the terminal. As shown in FIG. 2A or FIG. 2B, an input method is a Baidu input method, and the application that is to obtain a verification code is a WeChat application. WeChat sends a verification code obtaining request to the server. Then, the terminal receives an SMS message that includes a verification code and that is sent by the server. The Baidu input method reads the verification code in the SMS message, and displays the verification code (2460) in a display area of the Baidu input method on a user interface (User Interface, UI for short) of the terminal. As shown in FIG. 2A, the verification code (2460) may be displayed in the display area of the input method. Alternatively, as shown in FIG. 2B, the verification code (2460) may be displayed in an extended area of the input method on the UI.

The user performs an operation on the verification code 2460. Based on the operation of the user, the system automatically fills in, with 2460, the verification code input area, namely, a "Fill in a verification code" area shown in FIG. 2A. A manner in which the user performs an operation on the verification code displayed in the area of the input method includes: tap, double tap, touch and hold, press heavily, press gently, float, and the like. In addition, the operation herein may be replaced with voice, and is not necessarily a direct tap on a key of an input method keyboard. Alternatively, the operation is implemented by using eye tracking. To be specific, the user gazes at a button by using an eye, and when detecting motion of the eye of the user, the terminal automatically fills in the verification code input area with the verification code. In an embodiment, a prompt box "Tap to fill in a verification code" or a similar prompt statement pops up around the verification code, to facilitate the user operation.

In this way, a trouble that the user opens the SMS message application to view the verification code can be avoided. Then, the user fills in a verification code input box with the verification code based on the verification code displayed in the area of the input method application. In comparison with a solution of automatically filling in a verification code, this solution in which the verification code is first displayed in the area of the input method application and then the user manually enters the verification code can ensure accuracy of entering the verification code.

In another embodiment, after the input method application reads the verification code in the SMS message, the method further includes: displaying characters in a character string one by one on a keyboard of the input method application in a sequence of the characters in the character string included in the read verification code.

Referring to the SMS message examples 1 to 3, the character string may be a number string, and a quantity of digits in the number string may vary with different applications. Alternatively, the character string may be a letter string. For example, the verification code may be "nyNb". Alternatively, the character string may be a character string of a combination of numbers and letters. For example, the verification code may be "594nB".

In an embodiment, the characters in the character string are displayed one by one in an animation manner on an input method keyboard. The animation manner includes changing a size, a shape, a color, a border, a shade, or the like of a corresponding character in an area of the input method keyboard.

As shown in FIG. 3A to FIG. 3D, the following provides a description by using an example in which the verification code is a number string 2460.

Figure 3A:
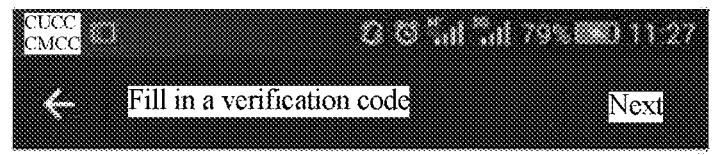
FIG. 3A is still another example diagram of displaying a verification code according to an embodiment of the present invention.
Figure 3A:
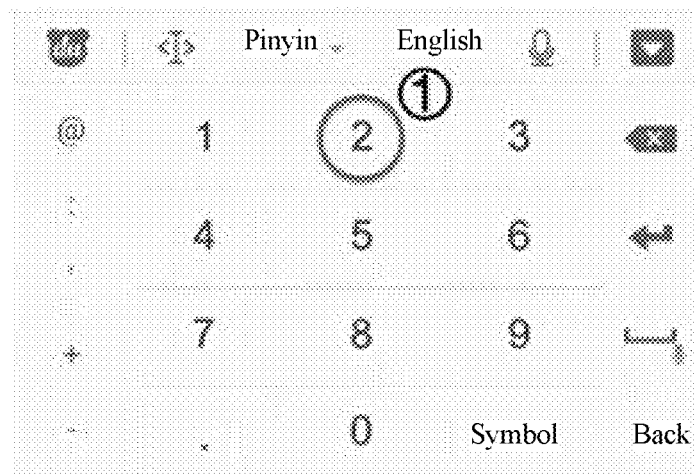
Figure 3B:
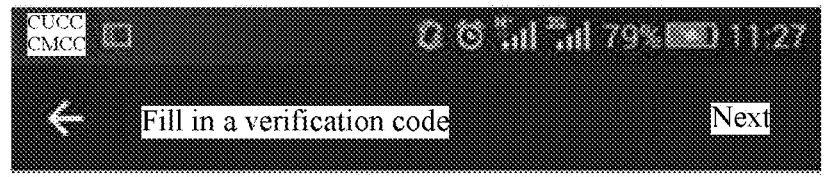
FIG. 3B is another example diagram of displaying a verification code according to an embodiment of the present invention.
Figure 3B:
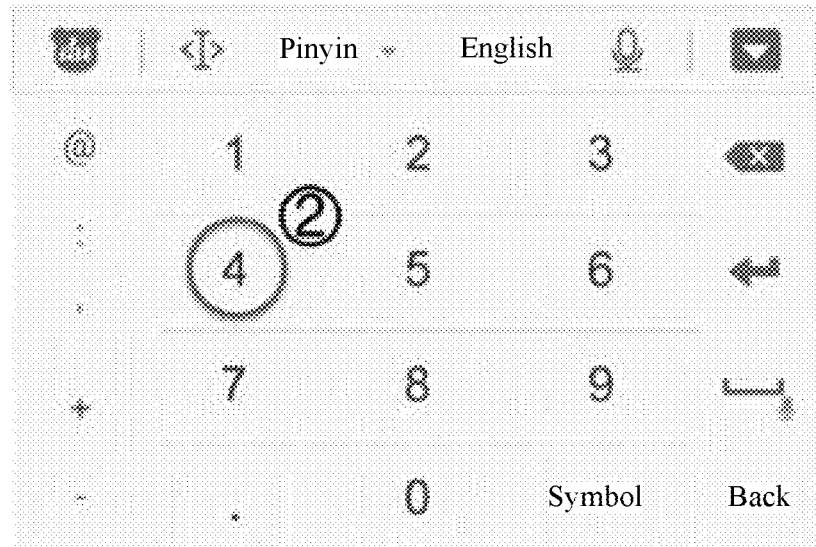

The animation manner may be adding, on the input method keyboard for prompting, a circular border to a character corresponding to the verification code. As shown in FIG. 3A, a first character of the verification code is a number 2. In this case, a circular border is added to the number 2 at a location of the number 2 on the input method keyboard. Animation manners of the other numbers are similar to the animation manner. To improve user experience, a "character sequence prompt" may be further added around the number 2. For example, the number 2 is the first character of the verification code 2460. In this case, a badge ① is added around the number 2 when a shape of the number 2 on the keyboard is changed, to prompt the user that this is the first character of the verification code that needs to be entered. As shown in FIG. 3B, after the user completes entering, the number 2 restores to an original state, and the badge ① is no longer displayed.

Figure 3C:
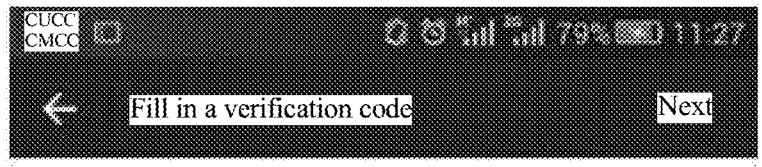
FIG. 3C is still another example diagram of displaying a verification code according to an embodiment of the present invention.
Figure 3C:
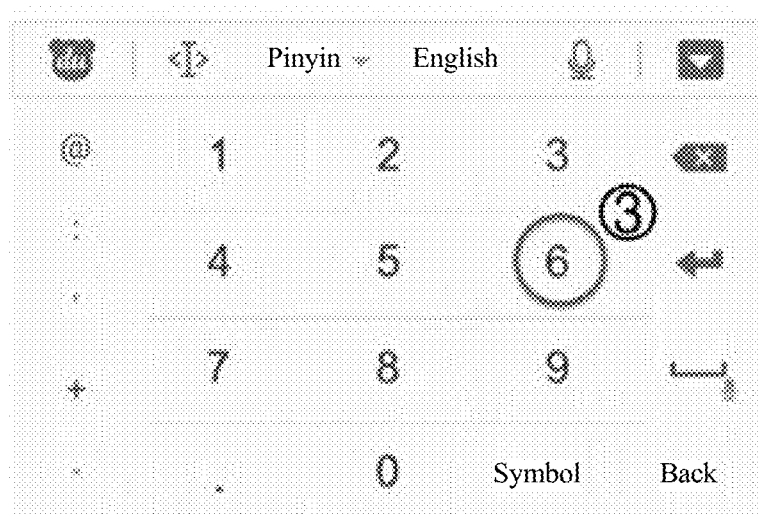
Figure 3D:
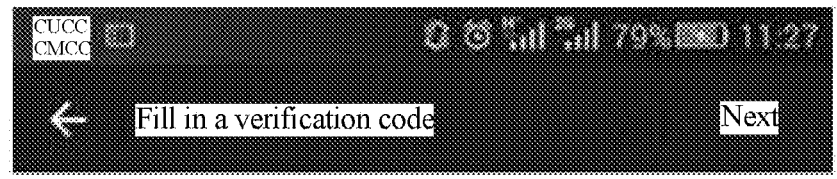
FIG. 3D is another example diagram of displaying a verification code according to an embodiment of the present invention.
Figure 3D:
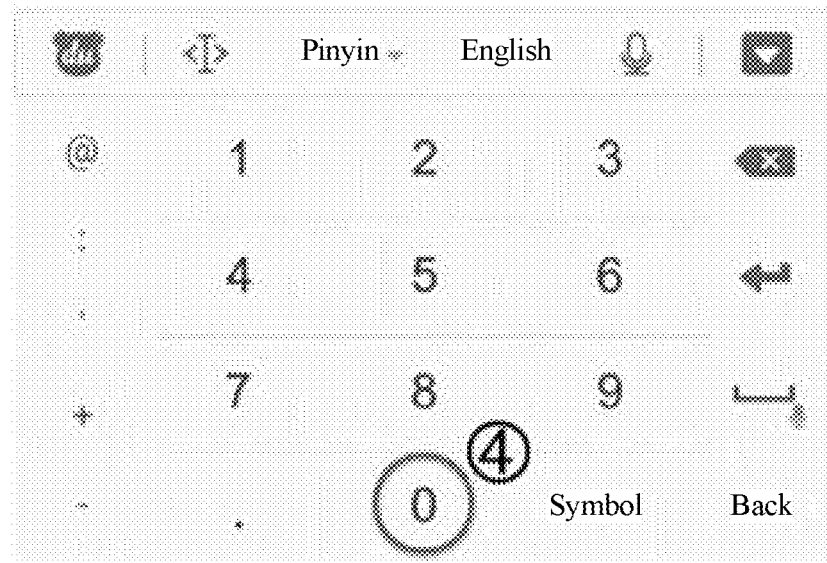

Similarly, as shown in FIG. 3B, the first character of the verification code is a number 4. After the number 2 restores to the original state, and the badge ① is no longer displayed, a circular border is added to the number 4 on the input method keyboard, and a prompt badge ② is displayed around the number 4, to prompt the user that this is the second character of the verification code that needs to be entered. As shown in FIG. 3C, after the user completes entering, the number 4 restores to an original state, and the badge ② is no longer displayed.

A prompt manner of a third character 6 and a fourth character 0 of the verification code is similar to that in the foregoing solution.

The manner of prompting verification code entering is more intuitive, thereby improving user experience.

In another embodiment, the SMS message application receives, within a preset time, at least two SMS messages that include a verification code and that are sent by the server. All SMS messages that include a verification code and that are received within the preset time are determined. An SMS message that includes an application identifier in all the SMS messages that include a verification code is determined. The application identifier is used to identify the application that is to obtain a verification code. The input method application reads a verification code in the SMS message that includes the application identifier.

In an example in which payment is performed on a Railway 12306 APP client on a mobile phone, at least two SMS messages that include a verification code and that are sent by the server are received within a preset time, and the method includes the following steps.

201. Determine all SMS messages that include a verification code and that are received within the preset time.

The preset time may be 2 minutes. For example, two SMS messages are received within 2 minutes. One is sent by Railway 12306, and the other is sent by Google. Content of the SMS messages is described in the "SMS message example 2" and the "SMS message example 3".

202. Determine an SMS message that includes an application identifier in all the SMS messages that include a verification code, where the application identifier is used to identify the application that is to obtain a verification code.

The SMS message that includes a verification code and that is sent by the Railway 12306 application usually includes an application identifier "[Railway Customer Service]". The application identifier is used to identify that the SMS message is sent by a Railway 12306 server. "[Railway Customer Service]" or "Railway Customer Service" may be the application identifier of the Railway 12306 application. Alternatively, the application identifier may be a string of characters, such as Alipay or WeChat.

203. The input method application reads a verification code in the SMS message that includes the application identifier.

The input method application reads the verification code 23680 in the SMS message example 2.

In another embodiment, if it is determined that there are at least two SMS messages that include the application identifier in all the SMS messages that include a verification code, an SMS message that is received at a latest time in the SMS messages that include the application identifier is determined. The input method application reads a verification code in the SMS message received at the latest time.

In the example in which payment is performed on the Railway 12306 APP client on the mobile phone, if it is determined that there are at least two SMS messages that include the application identifier in all the SMS messages that include a verification code, the method includes the following steps.

301 is the same as step 201.

302. If it is determined that there are at least two SMS messages that include the application identifier in all the SMS messages that include a verification code, determine an SMS message that is received at a latest time in the SMS messages that include the application identifier, where the application identifier is used to identify the application that is to obtain a verification code.

For example, three SMS messages are received within 2 minutes. One is sent by Google, and content of the SMS message is described in the SMS message example 3. One is sent by Railway 12306, content of the SMS message is described in the SMS message example 2, and a receiving time is "17:21:23 Oct. 9, 2015". One is sent by Railway 12306, and content of the SMS message is as follows:

SMS message example 4: Verification code: 223366. Please do not forward. A 12306 user is applying for a password modification service. If you did not perform this operation, please ignore this message. [Railway Customer Service]

A receiving time of the SMS message example 4 is "17:22:42 Oct. 9, 2015".

The receiving time of the SMS message example 4 is later. Therefore, it is determined that the SMS message example 4 is a verification code SMS message required by the Railway 12306 APP.

303. The input method application reads a verification code in the SMS message received at the latest time.

The input method reads the verification code 223366 in the SMS message example 4.

In the verification code obtaining method provided in this embodiment of the present invention, because only the input method application and the SMS message application are provided with the permission to read the SMS message in the terminal, leakage of information about the SMS message of the user can be prevented, and security of verification code information in the SMS message can be ensured.

Embodiment 2

Embodiment 2 provides a verification code obtaining method. The method includes the following steps.

401. An application that is to obtain a verification code sends a verification code obtaining request to a server, where the application that is to obtain a verification code runs on an operating system.

The application that is to obtain a verification code runs on the operating system. For example, the application may be WeChat, Alipay (Alipay), or the like. The operating system may be an Android operating system, an iOS operating system, and a Windows Phone operating system.

402. Based on a received SMS message that includes a verification code and that is sent by the server, the operating system reads the verification code in the SMS message, and sends the read verification code to a clipboard of the operating system.

A possible form of the SMS message is the same as that described in step 102.

In an example in which an Android system is used, a clipboard (clipboard) of the Android system is managed by a class ClipboardManager. The ClipboardManager represents the clipboard of the system, and is obtained by using getSystemService (CLIPBOARD_SERVICE). An invoking manner is android.content.ClipboardManager (since API Level 11).

An iOS system also has a clipboard.

403. The operating system receives a pasting instruction, and pastes the verification code on the clipboard in a verification code input area.

The pasting instruction may be a pasting instruction triggered by a user by tapping or touching and holding an input box, or may be a pasting instruction automatically triggered by the operating system when detecting that there is a verification code on the clipboard.

In this manner, the operating system directly reads the verification code onto the clipboard without a need to consider whether to provide another application program with SMS message read permission, so that it can be convenient for the user to enter the verification code, and it can be ensured that user SMS message privacy is not leaked.

Embodiment 3

Embodiment 3 provides a verification code obtaining apparatus. The apparatus is configured to perform the methods described in Embodiment 1 and Embodiment 2.

In an embodiment, applications installed on the verification code obtaining apparatus include an application that is to obtain a verification code, an input method application, and an SMS message application. The apparatus further includes: a sending unit, configured to send a verification code obtaining request to a server; a receiving unit, configured to receive an SMS message that includes a verification code and that is sent by the server; and a reading unit, configured to read the verification code in the SMS message, where the apparatus does not allow an application other than the input method application and the SMS message application to read an SMS message in the apparatus.

In another embodiment, the apparatus further includes a filling unit, configured to fill a verification code input area with the read verification code.

In still another embodiment, the apparatus further includes a first display unit, configured to display the read verification code in a display area of the input method application on the apparatus.

In another embodiment, the apparatus further includes a second display unit, configured to display characters in a character string one by one on a keyboard of the input method application in a sequence of the characters in the character string included in the read verification code.

In still another embodiment, the receiving unit is specifically configured to receive, within a preset time, at least two SMS messages that include a verification code and that are sent by the server.

The apparatus further includes: a first determining unit, configured to determine all SMS messages that include a verification code and that are received within the preset time; and a second determining unit, configured to determine an SMS message that includes an application identifier in all the SMS messages that include a verification code, where the application identifier is used to identify the application that is to obtain a verification code.

The reading unit is specifically configured to read a verification code in the SMS message that includes the application identifier.

In another embodiment, the second determining unit is specifically configured to: if it is determined that there are at least two SMS messages that include the application identifier in all the SMS messages that include a verification code, determine an SMS message that is received at a latest time in the SMS messages that include the application identifier; and the reading unit is specifically configured to read a verification code in the SMS message received at the latest time.

According to the apparatus provided in this embodiment of the present invention, leakage of information about an SMS message of a user can be prevented, and security of verification code information in the SMS message can be ensured.

Embodiment 4

Embodiment 4 provides a terminal, and the terminal is configured to perform the method described in Embodiment 1.

In an embodiment, the terminal includes a processor, a memory, and a transceiver.

The memory is configured to store applications. The applications are installed on the terminal, the applications stored in the memory include an application that is to obtain a verification code, an input method application, and an SMS message application, and the SMS message application is used to display an SMS message in the terminal.

The transceiver is configured to send a verification code obtaining request to a server.

The transceiver is further configured to receive an SMS message that includes a verification code and that is sent by the server.

The processor is configured to read the verification code in the SMS message. The terminal does not allow an application other than the input method application and the SMS message application to read an SMS message in the terminal.

In another embodiment, the processor is further configured to fill a verification code input area with the read verification code.

In still another embodiment, the processor is further configured to display the read verification code in a display area of the input method application on the terminal.

In another embodiment, the processor is further configured to display characters in a character string one by one on a keyboard of the input method application in a sequence of the characters in the character string included in the read verification code.

In still another embodiment, the transceiver is specifically configured to receive, within a preset time, at least two SMS messages that include a verification code and that are sent by the server.

The processor is further configured to: determine all SMS messages that include a verification code and that are received within the preset time; determine an SMS message that includes an application identifier in all the SMS messages that include a verification code, where the application identifier is used to identify the application that is to obtain a verification code; and read a verification code in the SMS message that includes the application identifier.

In another embodiment, the processor is further specifically configured to: if it is determined that there are at least two SMS messages that include the application identifier in all the SMS messages that include a verification code, determine an SMS message that is received at a latest time in the SMS messages that include the application identifier; and read a verification code in the SMS message received at the latest time.

According to the terminal provided in this embodiment of the present invention, leakage of information about an SMS message of a user can be prevented, and security of verification code information in the SMS message can be ensured.

An embodiment of the present invention further provides a terminal, and the terminal is configured to perform the method described in Embodiment 2.

The terminal includes a processor, a memory, and a transceiver.

The memory is configured to store an application that is to obtain a verification code.

The transceiver is configured to send a verification code obtaining request to a server.

The transceiver is further configured to receive an SMS message that includes a verification code and that is sent by the server.

The processor is configured to: read the verification code in the SMS message, and send the read verification code to a clipboard of the operating system.

The processor is further configured to paste the verification code on the clipboard in a verification code input area based on a pasting instruction.

According to the terminal provided in this embodiment of the present invention, in this solution, the processor directly reads the verification code onto the clipboard without a need to consider whether to provide another application program with SMS message read permission, so that it can be convenient for a user to enter the verification code, and it can be ensured that user SMS message privacy is not leaked.

Embodiment 5

Embodiment 5 provides a computer readable storage medium storing one or more programs, where the one or more programs include an instruction, a portable electronic device including a display and a plurality of applications performs the method described in Embodiment 1 and/or the method described in Embodiment 2 when the instruction is executed by the portable electronic device, and the display is configured to display an application running on the portable electronic device.

Finally, it should be noted that the foregoing embodiments are merely intended for describing examples of the technical solutions of the present invention other than limiting the present invention. Although the present invention and benefits of the present invention are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present invention.

What is claimed is:
1. An electronic device, comprising:
one or more processors; and a memory coupled to the one or more processor and configured to store instructions which, when executed by the one or more processors, cause the electronic device to:
- receive, by a short message service (SMS) application, a first SMS message comprising a first verification code;
- display a first user interface of a first application and a second user interface of an input method application, wherein the first user interface comprises an input area and a notification that the first verification code has been sent, wherein the second user interface comprises a keyboard, and wherein the second user interface is displayed below the first user interface;
- prevent the first application from acquiring the first verification code;
- acquire, by the input method application, the first verification code;
- automatically display the first verification code above the keyboard;
- receive a tap operation on the first verification code; and
- fill, in response to the tap operation, the first verification code to the input area.

2. The electronic device of claim 1, wherein the instructions further cause the electronic device to display the first verification code above a digital keyboard area of the input method application, wherein the notification comprises at least a portion of digits in the number, and wherein the first user interface further comprises an indication proximate to the input area to enter the first verification code to the input area.

3. The electronic device of claim 2, wherein the first application is from a third party.

4. The electronic device of claim 3, wherein the first verification code is 4 digits or 6 digits.

5. The electronic device of claim 4, wherein the electronic device comprises the first application, the input method application, the SMS application, and other applications, and wherein the instructions further cause the electronic device to prevent the other applications from acquiring the first verification code.

6. The electronic device of claim 4, wherein the instructions further cause the electronic device to:
- receive a second SMS message comprising a second verification code, wherein the second SMS message is received later than the first SMS message;
- automatically display the second verification code above the keyboard;
- receive a second tap operation on the second verification code; and
- fill, in response to the second tap operation, the second verification code to the input area.

7. The electronic device of claim 4, wherein the input method application and the SMS application are from a developer of a default operation system of the electronic device.

8. The electronic device of claim 1, wherein the first SMS message comprises an identifier of the first application.

9. The electronic device of claim 8, wherein the instructions further cause the electronic device to acquire the first verification code using the identifier after the first SMS message is received and before the first verification code is automatically displayed.

10. A method implemented by an electronic device, the method comprising:
- receiving, by a short message service (SMS) application, a first SMS message comprising a first verification code;
- displaying a first user interface of a first application and a second user interface of an input method application, wherein the first user interface comprises an input area and a notification that the first verification code has been sent to a number, wherein the second user interface comprises a keyboard, and wherein the second user interface is displayed below the first user interface;
- preventing the first application from acquiring the first verification code;
- acquiring, by the input method application, the first verification code;
- automatically displaying the first verification code above the keyboard;
- receiving a first operation on the first verification code; and
- filling, in response to the first operation, the first verification code to the input area.

11. The method of claim 10, further comprising displaying the first verification code above a digital keyboard area of the input method application, wherein the notification comprises at least a portion of digits in the number, and wherein the first user interface further comprises an indication proximate to the input area to enter the first verification code to the input area.

12. The method of claim 11, wherein the first application is from a third party.

13. The method of claim 12, wherein the first verification code is 4 digits or 6 digits.

14. The method of claim 10, wherein the electronic device comprises the first application, the input method application, the SMS application, and other applications, and wherein the method further comprises preventing the other applications from acquiring the first verification code.

15. The method of claim 10, further comprising:
- receiving a second SMS message comprising a second verification code, wherein the second SMS message is received later than the first SMS message;
- automatically displaying the second verification code above the keyboard;
- receiving a second operation on the second verification code; and
- filling, in response to the second operation, the second verification code to the input area.

16. The method of claim 15, wherein the first operation comprises a first tap, a first double tap, a first touch and hold, a first heavy press, a first gentle press, a first float, or first eye tracking, and wherein the second operation comprises a second tap, a second double tap, a second touch and hold, a second heavy press, a second gentle press, a second float, or second eye tracking.

17. The method of claim 14, wherein the input method application and the SMS application are from a developer of a default operation system of the electronic device.

18. The method of claim 10, wherein the first SMS message comprises an identifier of the first application.

19. The method of claim 18, further comprising acquiring the first verification code after receiving the first SMS message and before automatically displaying the first verification code.

20. A computer program product comprising computer-executable instructions stored on a non-transitory computer-readable medium that, when executed by one or more processors, cause an electronic device to:

receive, by a short message service (SMS) application, a first SMS message comprising a first verification code;
display a first user interface of a first application and a second user interface of an input method application, wherein the first user interface comprises an input area and a notification that the first verification code has been sent, wherein the second user interface comprises a keyboard, and wherein the second user interface is displayed below the first user interface;
prevent the first application from acquiring the first verification code;
acquire, by the input method application, the first verification code;
display the first verification code above the keyboard;
receive a tap operation on the first verification code; and
fill, in response to the tap operation, the first verification code to the input area.

* * * * *